Patented Feb. 27, 1923.

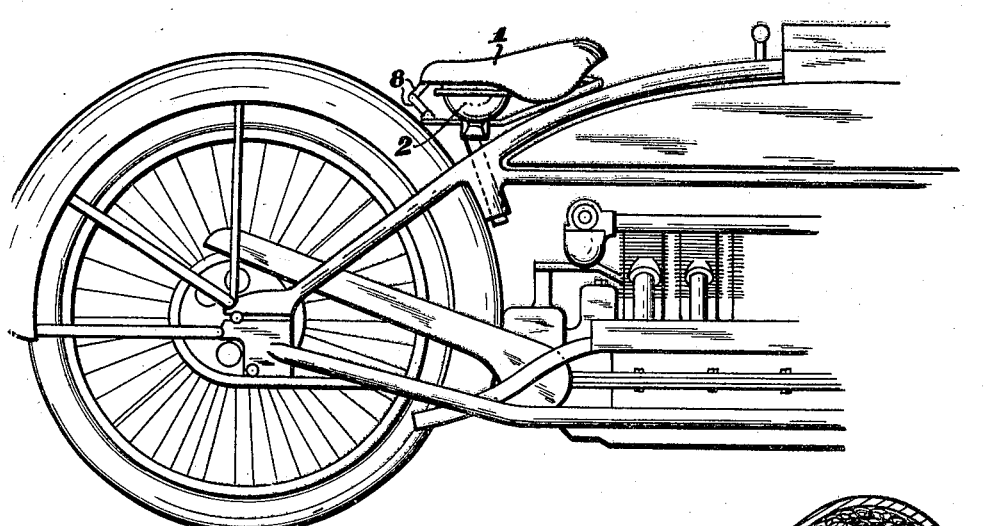
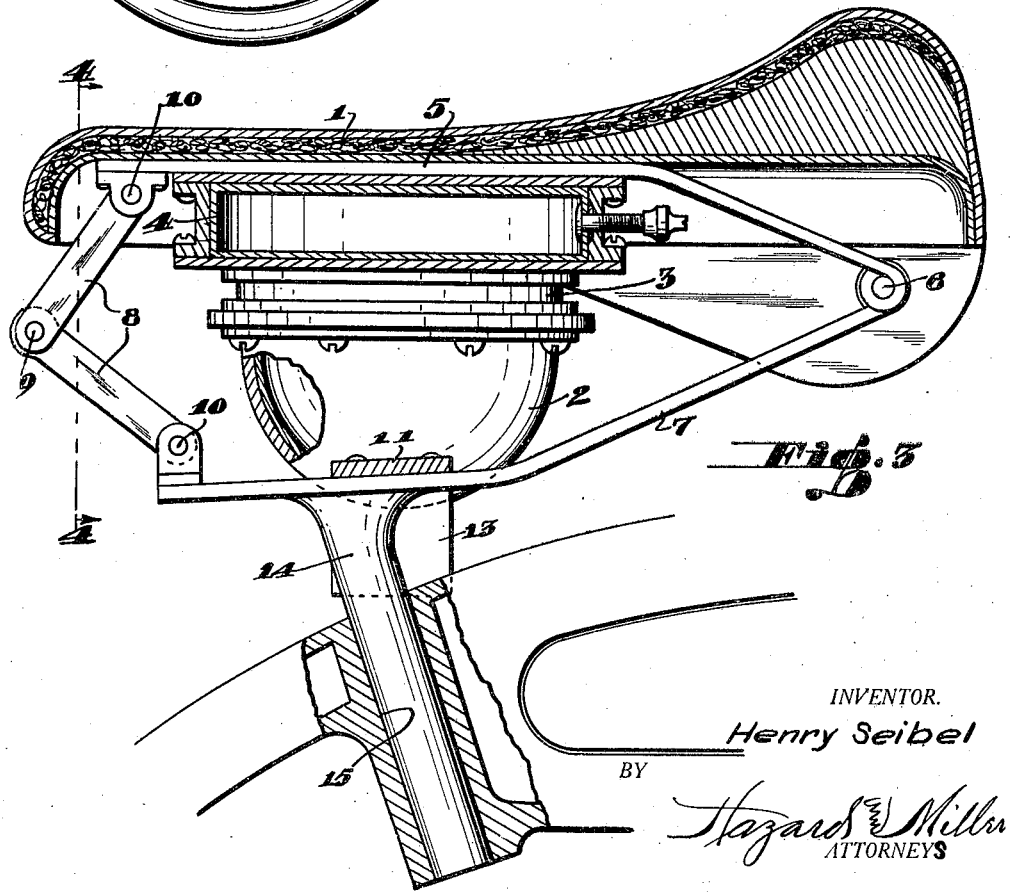

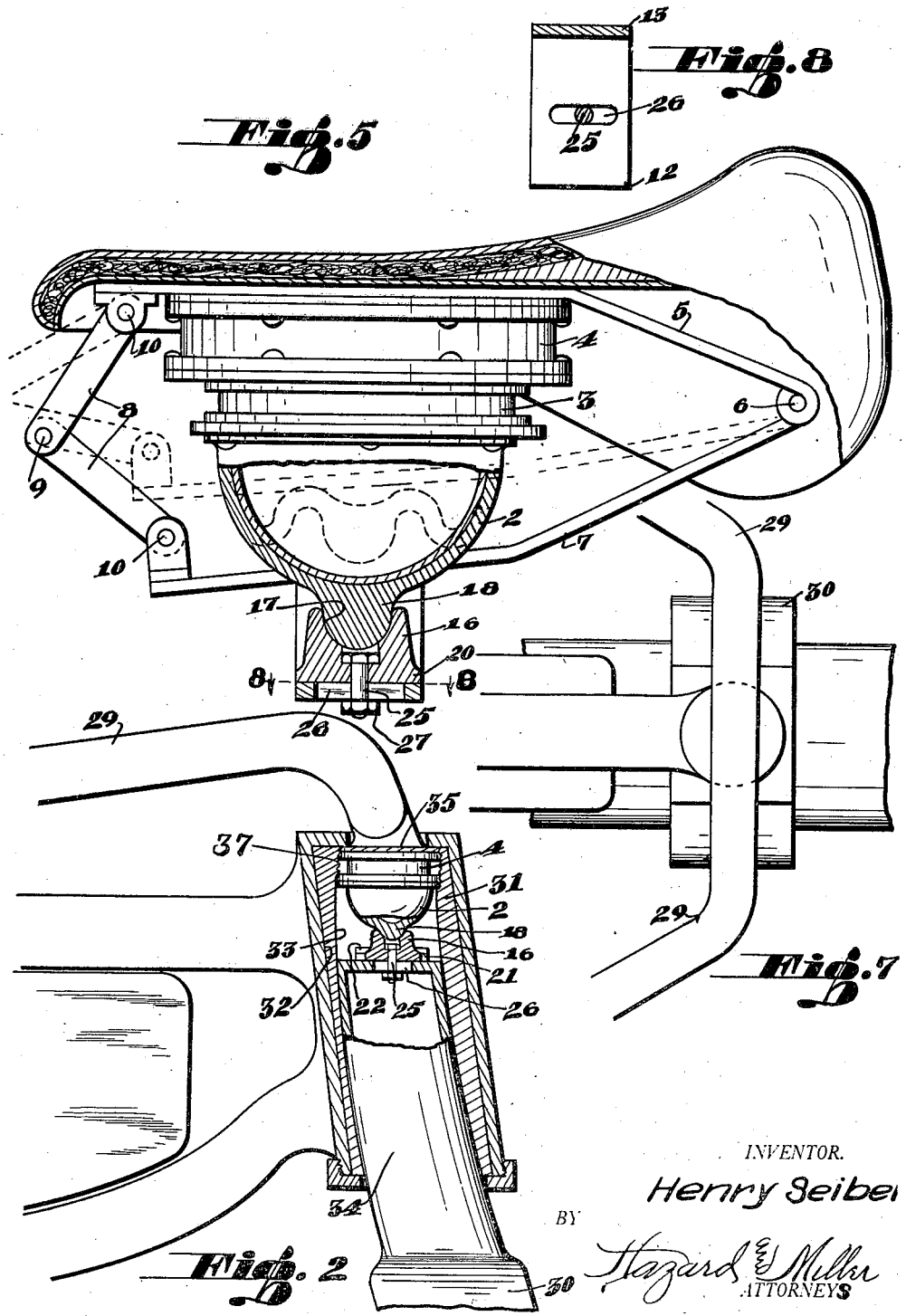

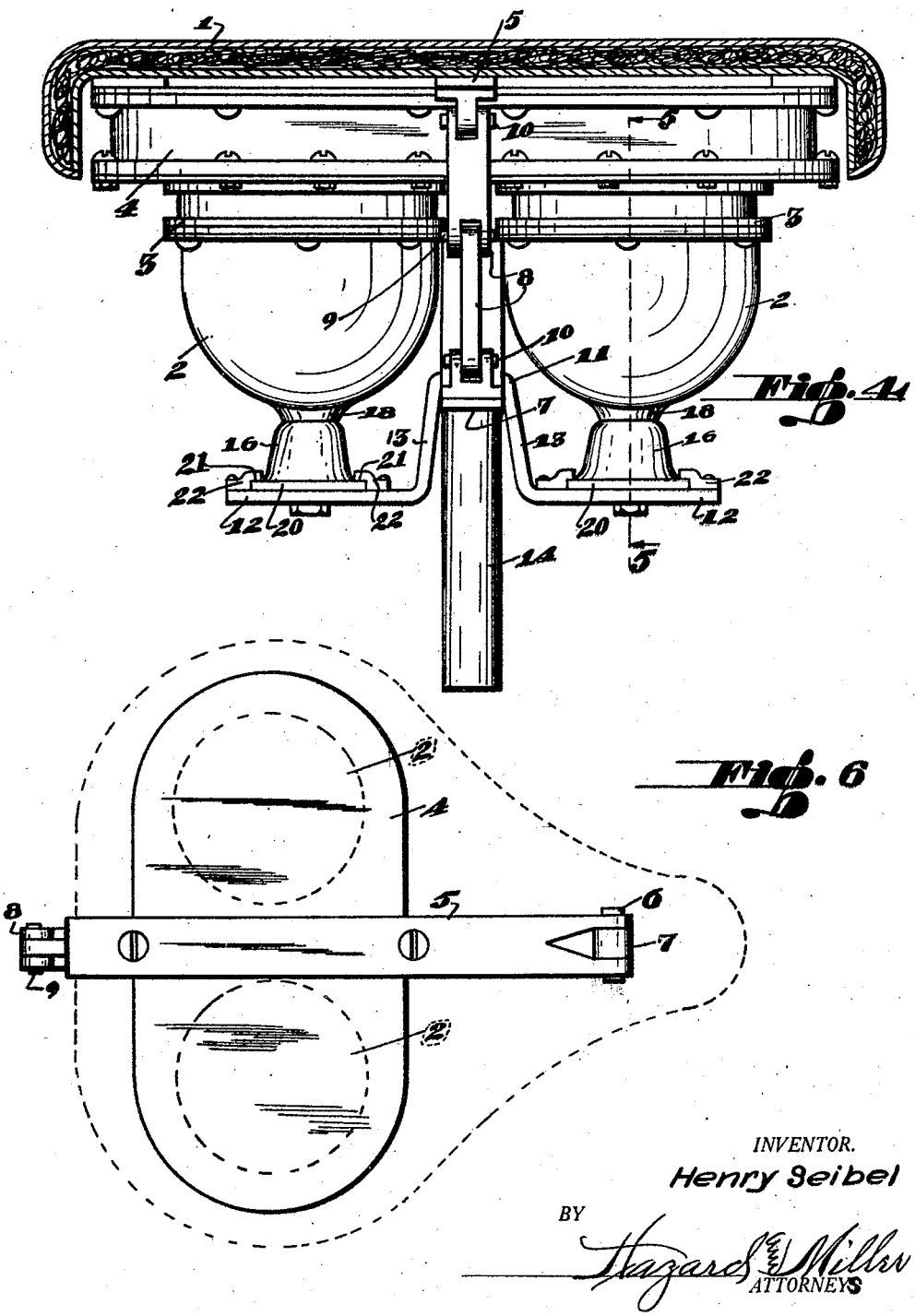

1,446,772

UNITED STATES PATENT OFFICE.

HENRY SEIBEL, OF SAN FRANCISCO, CALIFORNIA, ASSIGNOR TO UNITED AIR SPRING COMPANY OF ARIZONA, OF PHOENIX, ARIZONA, A CORPORATION OF ARIZONA.

PNEUMATIC SUPPORT.

Application filed July 2, 1920. Serial No. 393,554.

*To all whom it may concern:*

Be it known that I, HENRY SEIBEL, a citizen of the United States, residing at San Francisco, in the county of San Francisco and State of California, have invented new and useful Improvements in Pneumatic Supports, of which the following is a specification.

This invention relates to pneumatic supports which include a flexible supporting element and a deformer against which said element abuts and which is supported by a suitable connection so as to transmit shock and vibration from said connection to the flexible supporting element.

More particularly the invention relates to a construction of this character wherein the shock and vibration of the connecting member is transmitted to the flexible supporting element along an arcuate line so that the connecting member is moved transversely relative to the supporting element during the transmission of shock and vibration along said arcuate curve. In constructions of this character, as heretofore provided, this transverse movement of the connecting member relative to the supporting element has resulted in a wearing action between the deformer rigid with the connecting member and the supporting element, and has also resulted in a tendency of the deformer to shift to an undesirable degree relative to the supporting element.

It is the object of the present invention to provide a construction wherein the deformer is transversely shiftable relative to the connecting member so that the relative transverse position of the deformer and supporting element will remain unchanged during the lateral shifting of the connecting member.

The invention is particularly applicable to the construction of pneumatic supports for the seat and handle bars of a motor cycle and the like, and in the practical embodiment of the invention, as illustrated, I have shown the pneumatic supports utilized in this connection. It will be obvious, however, that such a pneumatic support may be advantageously employed in any construction where it is desired to provide a resilient supporting connection between a member subject to shock and vibration and a member from which it is desired to eliminate such shock and vibration.

The invention will be readily understood from the following description of the accompanying drawings, in which Figure 1 is a side elevation of a portion of a motor cycle having its seat mounted upon a pneumatic support constructed in accordance with the invention.

Fig. 2 is a side elevation of a portion of a motor cycle showing the handle bars thereof connected to the fork of the front wheel by the improved pneumatic support.

Fig. 3 is a vertical section through the motor cycle seat shown in Fig. 1.

Fig. 4 is a transverse section on the line 4—4 of Fig. 3.

Fig. 5 is a longitudinal section on the line 5—5 of Fig. 4.

Fig. 6 is a top plan view of the supporting means for the seat.

Fig. 7 is a top plan view of the handle bars and their connection.

Fig. 8 is a transverse section on the line 8—8 of Fig. 5.

In the drawings I have shown a motor cycle having a seat 1 mounted upon pneumatic supports 2. These supports, preferably, two in number are, preferably, of the form shown in my prior Patent No. 1,288,447, issued December 17, 1918, for a pneumatic support, and consist of flexible receptacles depending by means of a connection 3 from an air reservoir 4 with which they communicate. A supporting strip 5 is positioned upon the top of the reservoir 4 with the forward end of said strip pivoted by means of a pin 6 to a strip 7 extending rearwardly between the pneumatic supports 2. The rear ends of strips 5 and 7 are connected by a shackle comprising links 8 pivotally connected by the pin 9 at their inner ends and having the outer ends of the links pivotally connected by pins 10 to strips 5 and 7 respectively.

The seat 1 is rigidly mounted upon the reservoir 4. A cross arm 11 is rigidly connected to strip 7 beneath seat 1, said arm, preferably, including transversely extending ends 12 arranged beneath the respective supports 2 and an intermediate U-shaped portion 13 extending across strip 7 and suitably secured thereto with the arms of said U-shaped portion extending downwardly at each side of strip 7. A usual supporting rod 14 depends from strip 7 and is received within a suitable supporting recess 15 provided in the motor cycle frame. The ends 12 of cross arm 11 carry deformers 16 which are arranged to engage the respective pneumatic supports 2. The deformers for this purpose being shown as provided with recesses 17 in their upper ends arranged to receive co-operating protuberances 18 provided upon the pneumatic supports.

The shock and vibration of the motor cycle frame is transmitted through rod 15 to strip 7 which will swing upon the pivot 6 relative to the motor cycle seat. This arcuate movement of cross arm 11 which is rigid with rod 14 and will thereby move with the same, will cause lateral movement of said cross arm relative to the pneumatic supports. In order to prevent a simliar lateral movement of deformer 16 relative to the pneumatic supports, the deformers are arranged for lateral movement relative to the ends of the cross arm 11.

As an instance of this arrangement each of the deformers is provided with an enlarged lower end 20 forming opposite parallel shoulders 21, each of which is adapted to be received beneath a clip 22 secured upon the end 12 of the cross arm in such manner as to permit of movement of the deformer relative to the cross arm through the movement of shoulders 21 through the grooves provided by said clips. The clips will, however, prevent displacement of the deformers relative to the cross arm. The deformer may also be slidably retained relative to the cross arm 11 by means of a bolt 25 received through an elongated slot 26 provided in the cross arm with the end of the bolt extending through a suitable aperture in the deformer and having a retaining nut 27 upon the end thereof suitably countersunk into the deformer beneath the recess 17.

The handle bars of the motor cycle are shown at 29 and are flexibly supported relative to the front fork 30 of the motor cycle by a pneumatic support, such as previously described. As an instance of this arrangement a supporting sleeve 31 may depend from the handle bars at their pivotal axis, said sleeve being rotatably mounted in the bearing post 32 at the front of the motor cycle frame. The bore of the sleeve 31 is, preferably, curved longitudinally, as clearly shown at 33, said curved bore being arranged to receive the similarly longitudinally curved supporting rod 34 of the front fork 30. The rod of the fork is thus adapted for longitudinal movement through the sleeve 31, the longitudinal curve of the parts being arranged to permit of movement of the fork along the natural arc to which it will tend to conform as road shocks and vibrations are imparted to said fork.

A pneumatic support of the type previously described is positioned within the end of the bore of sleeve 31 between the end of rod 34 and the end 35 of said sleeve. This pneumatic support includes the reservoir 4, preferably, secured within sleeve 31 by the threaded connection 37. The flexible pneumatic receptacle 2 depending from the reservoir makes engagement, as previously described, with deformer 16 mounted upon the end of rod 34 so as to be laterally slidably moved relative thereto, said sliding adjustment including clips 22 engaging shoulders 21 upon the deformer and a bolt 25 extending through an elongated slot 26, as previously described.

By this arrangement it will be seen that the handle bars are adapted to turn sleeve 31, which through the binding engagement provided between said sleeve and rod 34 due to the longitudinal curve of these parts, will cause turning movement of the front fork of the motor cycle for steering the latter. At the same time the front fork is free for longitudinal movement relative to the handle bars along the curve of its natural arcuate movement, so as to absorb road shocks and vibrations by means of the pneumatic support provided between the front fork and the handle bars. The lateral movement of the supporting rod of the front fork relative to the pneumatic support is prevented from causing a similar lateral movement of the deformer relative to said pneumatic support, and excessive wear between the pneumatic support and the deformer is thus prevented.

It will be understood that the specific construction of the pneumatic support for the seat and handle bars of a motor cycle, as herein described, forms only one of many practical embodiments of such a pneumatic support, and it will also be understood that the deformer making engagement with the pneumatic support may be slidably mounted upon its supporting connection in various ways, it being only necessary for the purpose of this invention that the deformer be freely movable relative to its supporting connection so that the relative position of the deformer and pneumatic support may remain unchanged. It will also be understood that the improved pneumatic support is not restricted in its use to the seat and handle bars of a motor cycle or the like, but may be employed wherever it is desired to form a flexible supporting connection between parts having a tendency to shift laterally relative to one another.

Various changes may be made without departing from the spirit of the invention as claimed.

What is claimed is:

1. A yieldable support having a connection adapted to receive shock and vibration which is movable relative to said support in a direction responsive to said shock and vibration, and a member included in said support which is movable relative to said connection in order to prevent responsive lateral relative movement of the parts of said support.

2. A yieldable support having a connection movable laterally relative to said support, and a member included in said support movable relative to said connection in order to prevent responsive lateral relative movement of the parts of said support.

3. A yieldable support having a connection mounted for arcuate movement in the direction of yield of said support, and a member included in said support being movable relative to said connection in order to prevent responsive lateral relative movement of the parts of said support.

4. A yieldable support having a connection mounted for movement relative to said support responsive to shock and vibration, and a member included in said support movable relative to said connection in order to prevent responsive lateral relative movement of the parts of said support.

5. A yieldable support comprising a flexible supporting element, and a deformer engaging said element and having a supporting connection which is movable relative thereto.

6. A yieldable support comprising a flexible supporting element, a deformer having a universal bearing engagement with said support element, and a supporting connection for allowing lateral adjustment of the deformer to maintain a fixed relative position with respect to the supporting element.

7. The combination with a vehicle frame, of a yieldable support, a connection between said frame and support arranged for movement responsive to road shocks and vibration, and a member included in said support movable relative to said connection in order to prevent responsive lateral relative movement of the parts of said support.

8. The combination with a vehicle frame, of a yieldable support, a connection between said frame and support arranged for arcuate movement with the portions of said frame subject to road shocks and vibration, and a member included in said support movable relative to said connection in order to prevent responsive lateral relative movement of the parts of said support.

9. A yieldable support comprising a flexible supporting element, and a deformer engaging said element and having a supporting connection, said connection including guideways in which said deformer is slidable for movement relative to said supporting connection.

10. A yieldable support comprising a flexible supporting element, and a deformer engaging said element and having a supporting connection, said connection including a slot and a bolt carried by said deformer slidable in said slot for movement of said deformer relative to its supporting connection.

11. A yieldable support comprising a flexible supporting element, and a deformer engaging said element and having a supporting connection, said connection including guideways in which said deformer is slidable, and a slot adapted to receive a bolt carried by said deformer and slidable in said slot, for movement of said deformer relative to its supporting connection.

12. A vehicle seat having a flexible support, a deformer engaging said support, and a supporting member for said deformer having a pivotal connection with said seat, and supported by the vehicle frame, and arranged for lateral movement relative to said deformer.

In testimony whereof I have signed my name to this specification.

HENRY SEIBEL.